(12) United States Patent
Ishii et al.

(10) Patent No.: US 10,539,183 B2
(45) Date of Patent: Jan. 21, 2020

(54) ROLLING BEARING

(71) Applicant: JTEKT CORPORATION, Osaka-shi, Osaka (JP)

(72) Inventors: Yasuhiko Ishii, Kashiwara (JP); Yuya Yamamoto, Osaka (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/928,189

(22) Filed: Mar. 22, 2018

(65) Prior Publication Data

US 2018/0283453 A1   Oct. 4, 2018

(30) Foreign Application Priority Data

Mar. 31, 2017   (JP) .................................. 2017-071260

(51) Int. Cl.
| | |
|---|---|
| *F16C 33/48* | (2006.01) |
| *F16C 33/38* | (2006.01) |
| *F16C 19/06* | (2006.01) |
| *F16C 19/16* | (2006.01) |

(52) U.S. Cl.
CPC .......... *F16C 33/3887* (2013.01); *F16C 19/06* (2013.01); *F16C 19/163* (2013.01); *F16C 33/3856* (2013.01)

(58) Field of Classification Search
CPC .. F16C 19/163; F16C 33/3806; F16C 33/412; F16C 33/414; F16C 33/416; F16C 19/06; F16C 33/41
See application file for complete search history.

(56) References Cited

U.S. PATENT DOCUMENTS

| | | | |
|---|---|---|---|
| 3,350,148 A | 10/1967 | Sanguinetti et al. | |
| 3,414,275 A | 12/1968 | Takahashi | |
| 4,243,276 A | * 1/1981 | Persson ................... | F16C 33/38 |
| | | | 384/469 |

(Continued)

FOREIGN PATENT DOCUMENTS

| | | |
|---|---|---|
| DE | 102009009633 A1 | 8/2010 |
| FR | 1351942 A | 2/1964 |

(Continued)

OTHER PUBLICATIONS

Jan. 10, 2018 Office Action issued in U.S. Appl. No. 15/408,721.

(Continued)

*Primary Examiner* — Phillip A Johnson
(74) *Attorney, Agent, or Firm* — Oliff PLC (57) ABSTRACT

A rolling bearing includes an inner ring, an outer ring, a plurality of balls, and a cage in which a plurality of pockets that accommodate the balls are formed along the circumferential direction. The cage is a snap cage that has an annular body provided on one side in an axial direction, and a plurality of prongs provided so as to extend from the annular body toward the other side in the axial direction. Spaces on the other side of the annular body in the axial direction and between the prongs which are adjacent to each other in the circumferential direction serve as the pockets. A pocket surface of the pocket that faces the ball is a part of a spherical surface. The cage can contact the inner peripheral side of the outer ring for positioning in the radial direction.

5 Claims, 7 Drawing Sheets

(56) References Cited

U.S. PATENT DOCUMENTS

| | | | |
|---|---|---|---|
| 4,324,444 A * | 4/1982 | Buczynski | F16C 33/3806 |
| | | | 384/526 |
| 4,505,484 A | 3/1985 | Ohkuma et al. | |
| 4,557,612 A | 12/1985 | Neal | |
| 4,655,617 A | 4/1987 | Yasui et al. | |
| 4,874,073 A | 10/1989 | Tagawa | |
| 5,558,448 A | 9/1996 | Yabe et al. | |
| RE36,804 E | 8/2000 | Kajihara et al. | |
| 6,709,161 B2 | 3/2004 | Yakura et al. | |
| 7,029,181 B2 | 4/2006 | Terada et al. | |
| 7,547,146 B2 | 6/2009 | Kinno et al. | |
| 8,523,449 B2 | 9/2013 | Hamada et al. | |
| 8,876,395 B2 | 11/2014 | Sakaguchi | |
| 9,500,232 B2 | 11/2016 | Ishii | |
| 9,951,813 B2 * | 4/2018 | Taniguchi | F16C 33/3806 |
| 2006/0088235 A1 | 4/2006 | Ueda | |
| 2007/0154124 A1 | 7/2007 | Inoue et al. | |
| 2011/0002568 A1 | 1/2011 | Kawamura et al. | |
| 2011/0142388 A1 | 6/2011 | Maejima et al. | |
| 2012/0301065 A1 | 11/2012 | Mori et al. | |
| 2012/0308172 A1 * | 12/2012 | Shaikh | F16C 19/182 |
| | | | 384/523 |
| 2016/0053810 A1 * | 2/2016 | Ishii | F16C 19/166 |
| | | | 384/473 |
| 2017/0204908 A1 | 7/2017 | Ishii et al. | |

FOREIGN PATENT DOCUMENTS

| | | | | |
|---|---|---|---|---|
| FR | 2308013 A1 * | 11/1976 | | F16C 33/3806 |
| FR | 3001512 A1 * | 8/2014 | | F16C 33/412 |
| JP | 2004-068924 A | 3/2004 | | |
| JP | 2004-100917 A | 4/2004 | | |
| JP | 2004-211862 A | 7/2004 | | |
| JP | 2004-239293 A | 8/2004 | | |
| JP | 2004-293563 A | 10/2004 | | |
| JP | 2005-076660 A | 3/2005 | | |
| JP | 2005-233248 A | 9/2005 | | |
| JP | 2007-112920 A | 5/2007 | | |
| JP | 2010-048326 A | 3/2010 | | |
| JP | 2010-048328 A | 3/2010 | | |
| JP | 2010-164122 A | 7/2010 | | |
| JP | 2011043214 A * | 3/2011 | | F16C 19/163 |
| JP | 2011-208662 A | 10/2011 | | |
| JP | 2012036990 A * | 2/2012 | | F16C 33/3856 |
| JP | 2012-184814 A | 9/2012 | | |
| JP | 5636819 B2 | 12/2014 | | |
| JP | 2015-086940 A | 5/2015 | | |
| JP | 2016-023647 A | 2/2016 | | |
| JP | 2016-223598 A | 12/2016 | | |
| JP | 2017-009016 A | 1/2017 | | |
| WO | 2004/007983 A1 | 1/2004 | | |
| WO | 2016/010057 A1 | 1/2016 | | |
| WO | 2016/083133 A1 | 6/2016 | | |

OTHER PUBLICATIONS

Sep. 17, 2018 Office Action issued in U.S. Appl. No. 16/053,179.

Aug. 30, 2016 International Search Report issued in International Patent Application No. PCT/JP2016/066287.

Aug. 30, 2016 Written Opinion issued in International Patent Application No. PCT/JP2016/066287.

Sep. 20, 2018 Office Action issued in U.S. Appl. No. 15/919,936.

Jul. 31, 2018 Notice of Allowance issued in U.S. Appl. No. 15/408,721.

U.S. Appl. No. 16/144,618, filed Sep. 27, 2018 in the name of Yamamoto et al.

U.S. Appl. No. 15/408,721, filed Jan. 18, 2017 in the name of Ishii et al.

U.S. Appl. No. 16/053,179, filed Aug. 2, 2018 in the name of Ishii et al.

U.S. Appl. No. 15/919,936, filed Mar. 13, 2018 in the name of Ishii et al.

U.S. Appl. No. 15/578,482, filed Nov. 30, 2017 in the name of Ishii et al.

Jun. 28, 2018 Notice of Allowance issued in U.S. Appl. No. 15/578,482.

* cited by examiner

ROLLING BEARING

INCORPORATION BY REFERENCE

The disclosure of Japanese Patent Application No. 2017-071260 filed on Mar. 31, 2017 including the specification, drawings and abstract, is incorporated herein by reference in its entirety.

BACKGROUND OF THE INVENTION

1. Field of the Invention

The present invention relates to a rolling bearing.

2. Description of the Related Art

Figure 8:
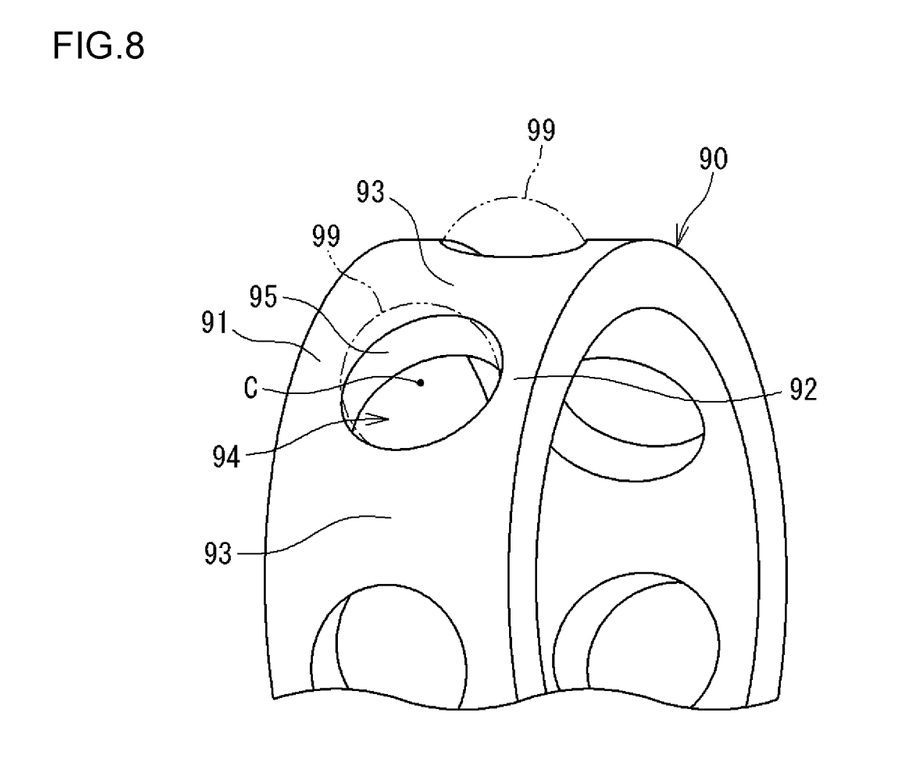
FIG. 8 is a perspective view of (a part of) a cage of a rolling bearing according to the related art.

In a rolling bearing (ball bearing) used in a high-speed rotation environment, a so-called machined cage is adopted as a cage that holds balls that serve as rolling elements in consideration of the rotational balance and deformation due to a centrifugal force (see Japanese Patent Application Publication No. 2016-23647 (JP 2016-23647 A), for example). As illustrated in FIG. 8, a machined cage 90 includes a first annular portion 91, a second annular portion 92, and a plurality of cage bars 93. The first annular portion 91 is positioned on one side of balls 99 in the axial direction. The second annular portion 92 is positioned on the other side of the balls 99 in the axial direction. The cage bars 93 couple the annular portions 91 and 92 to each other. The machined cage 90 has a symmetrical shape between one side and the other side in the axial direction with reference to a center C of a pocket 94 that accommodates the ball 99.

In the machined cage 90, the pocket 94 has a pocket surface 95 in a cylindrical shape. The ball 99 can contact the pocket surface 95. When the bearing is rotated, the pocket surface 95 and the ball 99 repeatedly contact each other with the ball 99 pressed against the pocket surface 95 etc. because of the ball 99 being advanced and delayed etc. In the related art, the pocket surface 95 has a cylindrical shape as described above, and thus the ball 99 and the pocket surface 95 substantially makes point contact with each other. Therefore, the pocket surface 95 is subjected to a high surface pressure. When the ball 99 and the pocket surface 95 make sliding contact with each other with a high surface pressure, excessive heat may be caused, and the cage 90 may be worn, which wears the bearing.

SUMMARY OF THE INVENTION

It is an object of the present invention to suppress wear of a cage due to contact between a ball and a pocket surface.

An aspect of the present invention provides a rolling bearing including: an inner ring; an outer ring; a plurality of balls provided between the inner ring and the outer ring; and a cage in which a plurality of pockets that accommodate the balls are formed along a circumferential direction, in which: the cage is a snap cage that has an annular body provided on one side in an axial direction, and a plurality of prongs provided so as to extend from the annular body toward the other side in the axial direction, spaces on the other side of the annular body in the axial direction and between the prongs which are adjacent to each other in the circumferential direction serving as the pockets; a pocket surface of the pocket that faces the ball is a part of a spherical surface; and the cage can contact an inner peripheral side of the outer ring for positioning in a radial direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
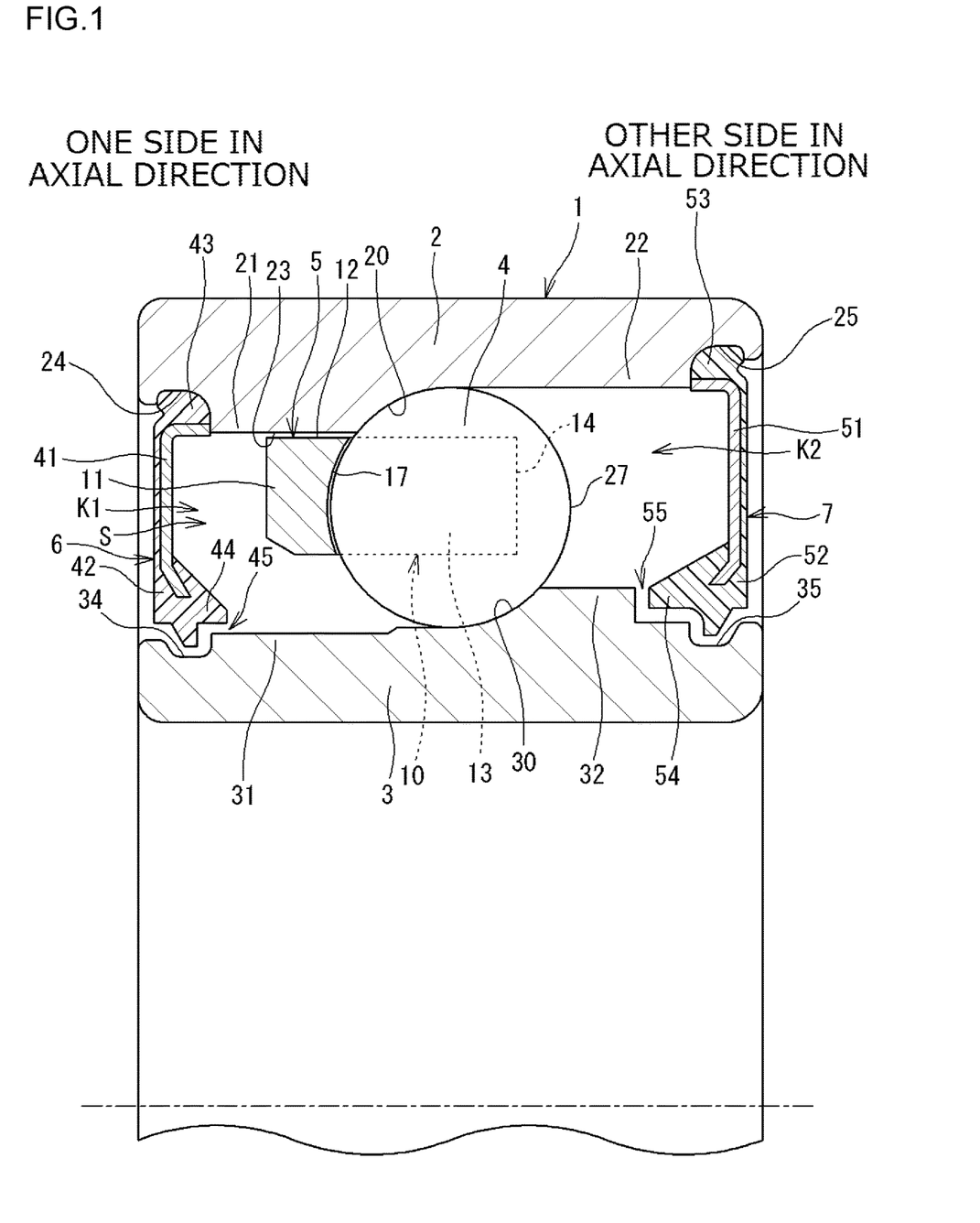
FIG. 1 is a sectional view illustrating a rolling bearing according to an embodiment of the present invention.

FIG. 1 is a sectional view illustrating a rolling bearing according to an embodiment of the present invention. The rolling bearing is an angular contact ball bearing 1, and includes an outer ring 2, an inner ring 3, a plurality of balls (rolling elements) 4, an annular cage 5, a first sealing device 6, and a second sealing device 7. An annular space S formed between the outer ring 2 and the inner ring 3 is filled with grease. That is, the angular contact ball bearing 1 adopts grease lubrication. The angular contact ball bearing 1 according to the present embodiment is used under high-speed rotation conditions, and specifically used in a high-speed rotation environment with a dmn value of one million or more and two millions or less. The angular contact ball bearing 1 is used in a high-temperature environment at 100 degrees to 150 degrees Celsius. In the following description, terms "one side in the axial direction" and "other side in the axial direction" are used to indicate positions in the axial direction. The one side in the axial direction corresponds to the left side in FIG. 1. The other side in the axial direction corresponds to the right side in FIG. 1.

An outer ring raceway groove 20 in which the balls 4 roll is formed in the inner peripheral surface of the outer ring 2. The balls 4 contact the outer ring raceway groove 20 at a predetermined contact angle. The outer ring 2 has a first outer shoulder portion 21 and a second outer shoulder portion 22 on both sides in the axial direction across the outer ring raceway groove 20. In the present embodiment, the inside diameter (shoulder diameter) of the second outer shoulder portion 22 is larger than the inside diameter (shoulder diameter) of the first outer shoulder portion 21. A first groove 24 for fixing the sealing device 6 is formed at an end portion of the first outer shoulder portion 21 on one side in the axial direction. A second groove 25 for fixing the sealing device 7 is formed at an end portion of the second outer shoulder portion 22 on the other side in the axial direction. The inner peripheral surface of the outer ring 2 has a shape in which the inside diameter becomes larger from one side toward the other side in the axial direction as a whole (excluding regions in which the first groove 24 and the second groove 25 are formed). The first outer shoulder portion 21 which is adjacent to the first groove 24 has the smallest diameter. The second outer shoulder portion 22 which is adjacent to the second groove 25 has the largest diameter.

An inner ring raceway groove 30 in which the balls 4 roll is formed in the outer peripheral surface of the inner ring 3. The balls 4 contact the inner ring raceway groove 30 at a predetermined contact angle. The inner ring 3 has a first inner shoulder portion 31 and a second inner shoulder portion 32 on both sides in the axial direction across the inner ring raceway groove 30. In the present embodiment, the outside diameter (shoulder diameter) of the second inner shoulder portion 32 is larger than the outside diameter (shoulder diameter) of the first inner shoulder portion 31. A first seal groove 34 is formed at an end portion of the first inner shoulder portion 31 on one side in the axial direction. A second seal groove 35 is formed at an end portion of the second inner shoulder portion 32 on the other side in the axial direction. The outer peripheral surface of the inner ring 3 has a shape in which the outside diameter becomes larger from one side toward the other side in the axial direction as a whole (excluding regions in which the seal grooves 34 and 35 are formed). The first inner shoulder portion 31 which is adjacent to the first seal groove 34 has the smallest diameter. The second inner shoulder portion 32 which is adjacent to the second seal groove 35 has the largest diameter. An outer ring with different shoulder diameters on one side and the other side in the axial direction, as with the outer ring 2 according to the present embodiment, will hereinafter be referred to as a "counterbored outer ring". In addition, an inner ring with different shoulder diameters on one side and the other side in the axial direction, as with the inner ring 3 according to the present embodiment, will hereinafter be referred to as a "counterbored inner ring".

The plurality of balls 4 are provided in the annular space S between the outer ring 2 and the inner ring 3. When the angular contact ball bearing 1 is rotated (when the inner ring 3 is rotated in the present embodiment), the balls 4 roll in the outer ring raceway groove 20 and the inner ring raceway groove 30 while being held by the cage 5.

Figure 2:
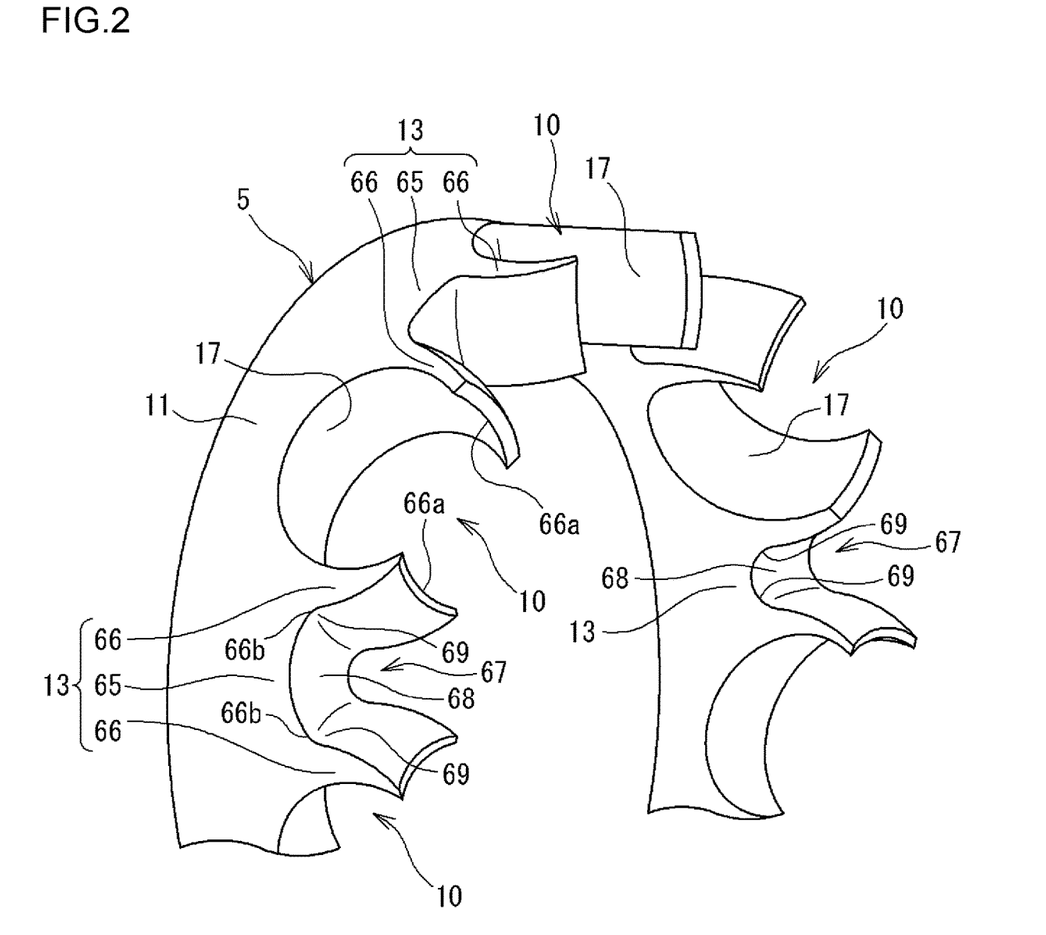
FIG. 2 is a perspective view illustrating a part of a cage.

FIG. 2 is a perspective view illustrating a part of the cage 5. In FIGS. 1 and 2, the cage 5 can hold the plurality of balls 4 at predetermined intervals (equal intervals) along the circumferential direction. To this end, a plurality of pockets 10 for accommodating the balls 4 are formed in the cage 5 along the circumferential direction. The cage 5 has an annular body (annular portion) 11 and a plurality of prongs (cage bars) 13. The annular body 11 is provided on one side of the balls 4 in the axial direction. The prongs (cage bars) 13 are provided so as to extend from the annular body 11 toward the other side in the axial direction. Spaces on the other side of the annular body 11 in the axial direction and between the prongs 13 and 13 which are adjacent to each other in the circumferential direction constitute the pockets 10 for accommodating the balls 4. That is, the cage 5 is a so-called snap cage, and the pockets 10 open toward the other side in the axial direction. The cage 5 according to the present embodiment is made of a resin such as PEEK, PA46, or PPS. The cage 5 may be a mixture of the resin described above and at least one of reinforcement fibers selected from glass fibers, carbon fibers, and aramid fibers.

The annular body 11 is an annular portion that is continuous in the circumferential direction. The prongs 13 extend from the annular body 11 toward the other side in the axial direction. In FIG. 2, the prongs 13 according to the present embodiment each have a body portion 65 and a pair of hook portions 66 and 66. The body portion 65 is provided so as to extend from the annular body 11 toward the other side in the axial direction. The hook portions 66 and 66 are branched from the body portion 65 to further extend toward the other side in the axial direction.

Figure 3:
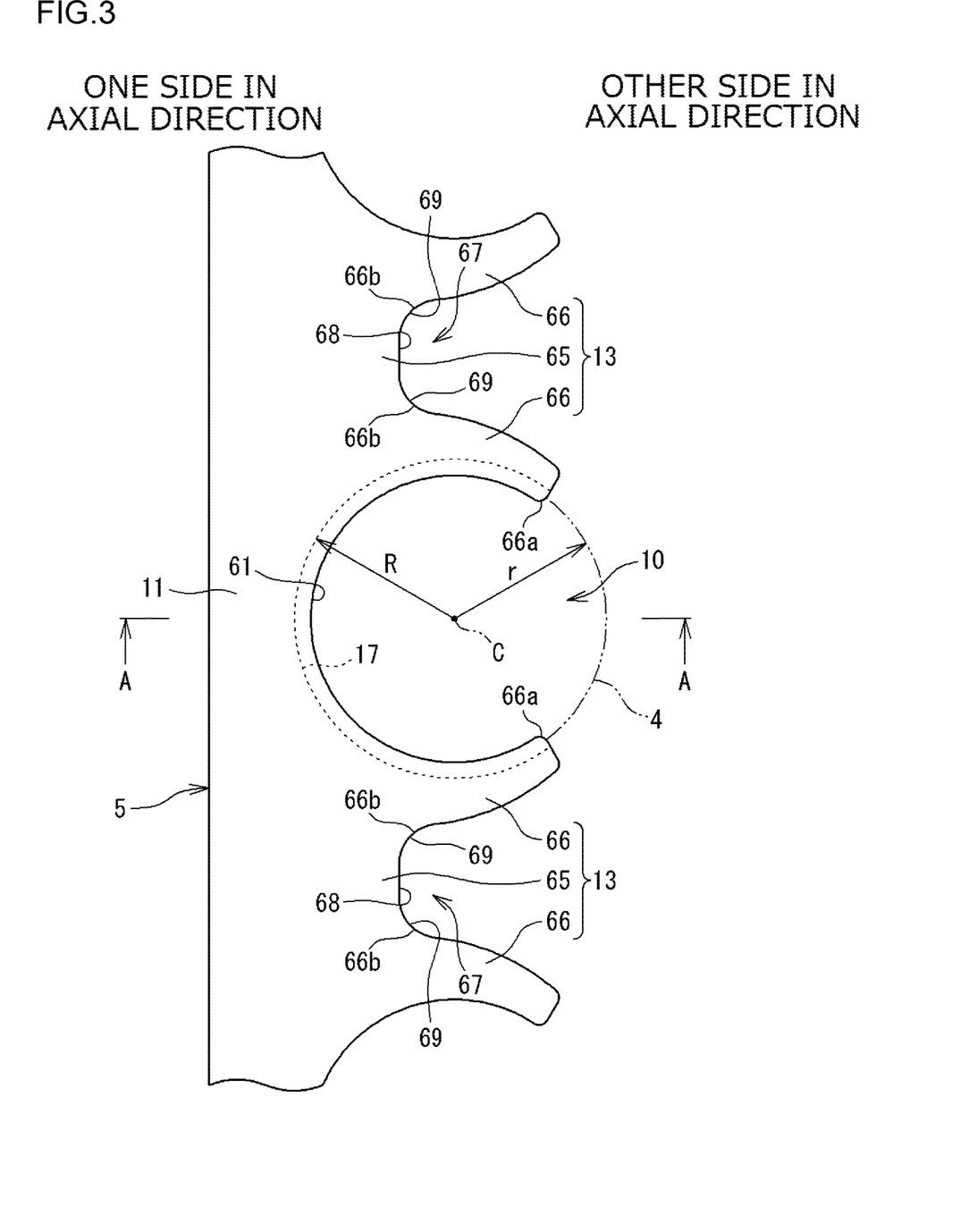
FIG. 3 illustrates a part of the cage as seen from the radially outer side.

FIG. 3 illustrates a part of the cage 5 as seen from the radially outer side. The pocket 10 opens between distal end portions 66a and 66a of the hook portions 66 and 66. The distance between the distal end portions 66a and 66a is smaller than the diameter of the ball 4. Therefore, the hook portions 66 and 66 are elastically deformed in order for the ball 4 to be accommodated in the pocket 10.

In FIG. 1, an end portion 14 of the prong 13 on the other side in the axial direction is positioned on one side in the axial direction with respect to an end portion position 27 of the ball 4 on the other side in the axial direction, and the prong 13 is short in the axial direction. A part of the cage 5 on the outer peripheral side can contact a part of the outer ring 2 on the inner peripheral side. The cage 5 according to the present embodiment is of an outer ring guide type to be positioned in the radial direction by the outer ring 2. That is, when the bearing is rotated, an outer peripheral surface 12 of the annular body 11 makes sliding contact with an inner peripheral surface 23 of the first outer shoulder portion 21.

The first sealing device 6 includes an annular core metal 41 and a seal body 42 fixed to the core metal 41. The core metal 41 is made of metal. The seal body 42 is made of rubber. The seal body 42 is fixed to the core metal 41. The seal body 42 has a radially outside end portion 43 attached to the first groove 24, and a lip portion (first lip portion) 44 that faces the seal groove 34 with a clearance. The first sealing device 6 is attached to the outer ring 2 with the radially outside end portion 43 fitted with the first groove 24 to be fixed. A slight clearance is formed between the first lip portion 44 and the seal groove 34. The clearance serves as a first labyrinth clearance 45. From the above, the first sealing device 6 is a labyrinth seal (non-contact seal).

The second sealing device 7 includes an annular core metal 51 and a seal body 52 fixed to the core metal 51. The core metal 51 is made of metal. The seal body 52 is made of rubber. The seal body 52 is fixed to the core metal 51. The seal body 52 has a radially outside end portion 53 attached to the second groove 25, and a lip portion (second lip portion) 54 that faces the seal groove 35 with a clearance. The second sealing device 7 is attached to the outer ring 2 with the radially outside end portion 53 fitted with the second groove 25 to be fixed. A slight clearance is formed between the second lip portion 54 and the seal groove 35. The clearance serves as a second labyrinth clearance 55. From the above, the second sealing device 7 is a labyrinth seal (non-contact seal). A bearing that is suitable for high-speed rotation is obtained by forming the first sealing device 6 and the second sealing device 7 as non-contact seals.

In the angular contact ball bearing 1 illustrated in FIG. 1, an action (pump action) that pumps the grease from one side toward the other side in the axial direction (from the left side toward the right side in FIG. 1) in the annular space S is caused when the inner ring 3 is rotated. In the present embodiment, an action that pumps the grease from one side in the axial direction (first inner shoulder portion 31 side) toward the other side in the axial direction (second inner shoulder portion 32 side) along the outer peripheral surface of the inner ring 3 is caused by the counterbored inner ring shape of the inner ring 3. The outer ring 2 also has a counterbored outer ring shape, and thus causes an action that pumps the grease from the one side in the axial direction toward the other side in the axial direction. Movement of the grease in the same direction is caused also by spinning (rotation) of the balls 4 which revolve. This action is enhanced particularly in the case where the bearing is rotated at a high speed. Then, the grease in the annular space S is collected in a space K2 on the other side in the axial direction, rather than a space K1 on one side in the axial direction, to cause deviation of the grease. Thus, the second sealing device 7 prevents the grease which is collected in the space K2 from leaking out of the bearing.

Figure 4:
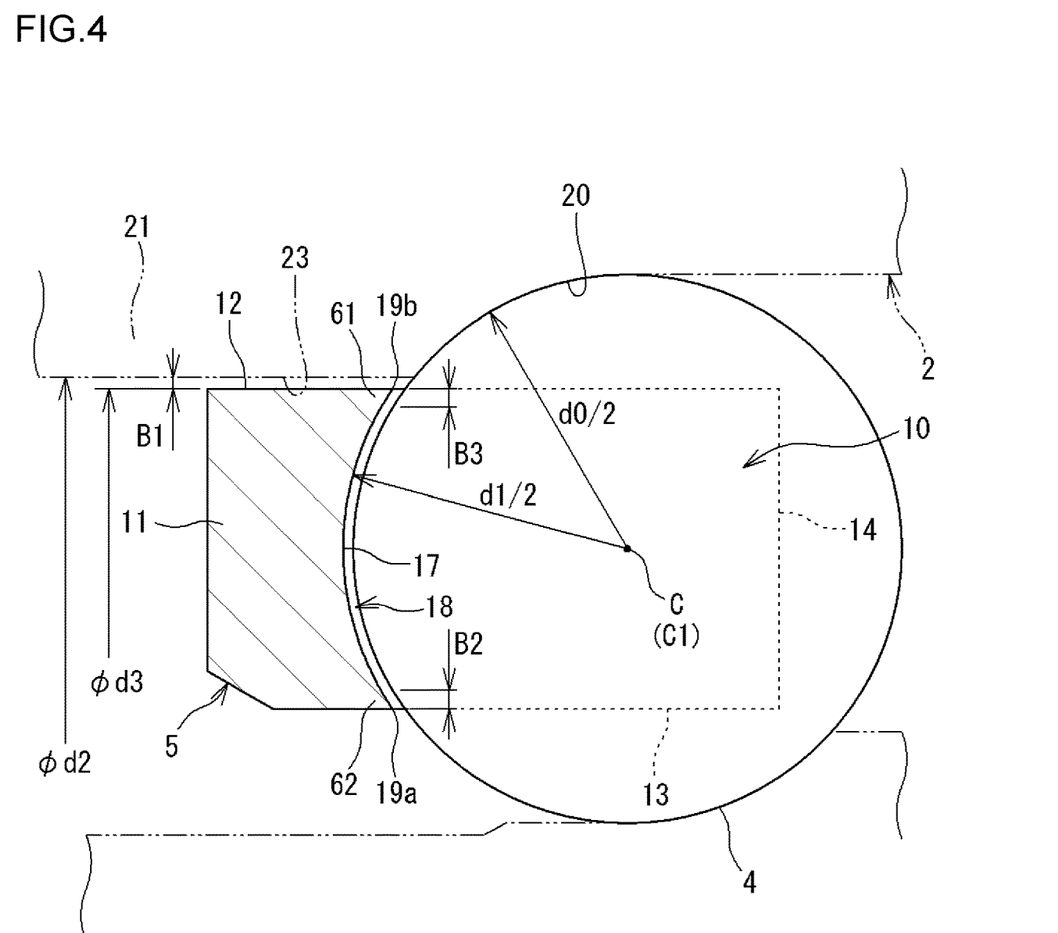
FIG. 4 is a sectional view taken along the arrow A in FIG. 3.
Figure 5:
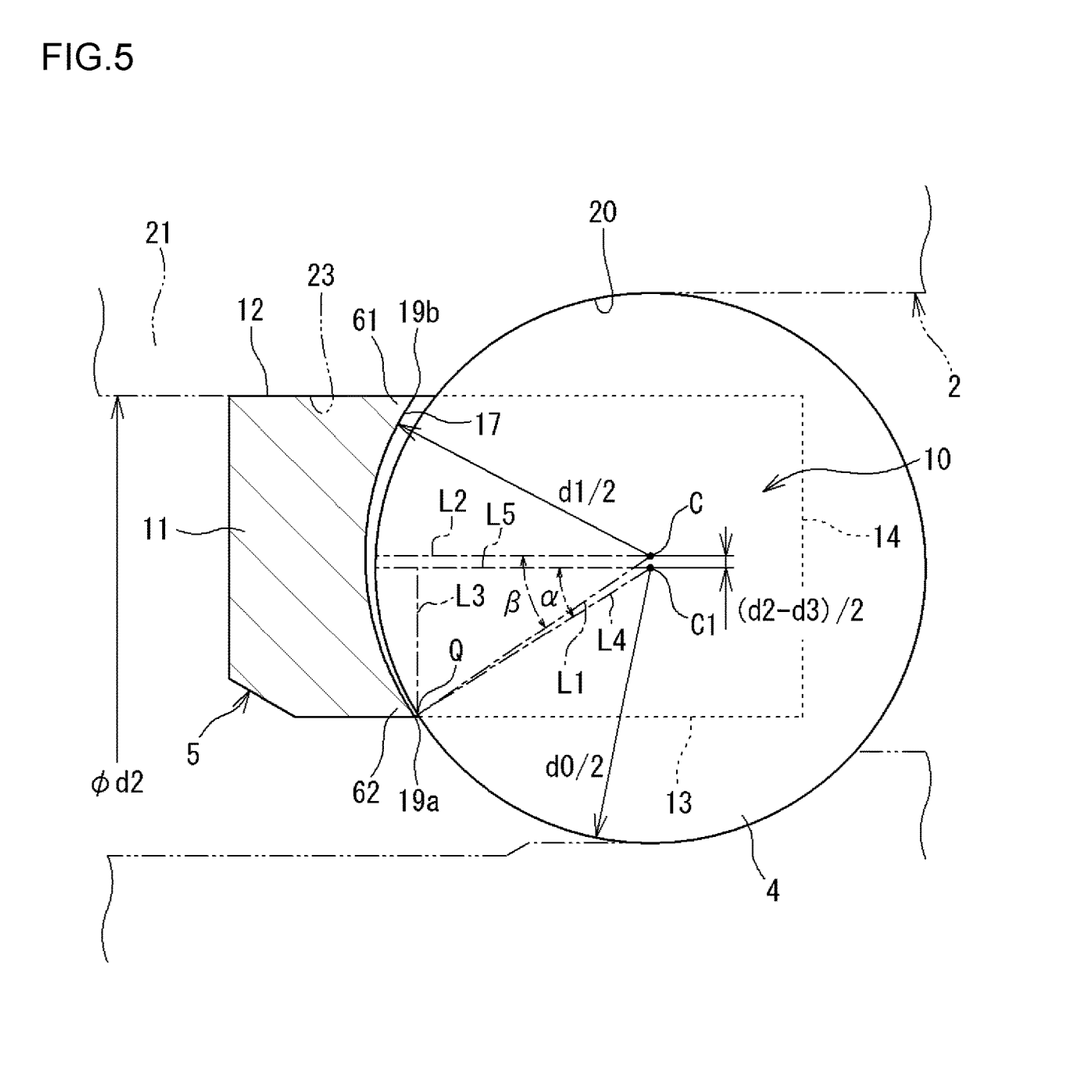
FIG. 5 is a sectional view taken along the arrow A in FIG. 3.

The cage 5 will be further described. FIGS. 4 and 5 are each a sectional view taken along the arrow A in FIG. 3, including the central axis of the cage 5 and also including a center C of the pocket 10. In FIGS. 4 and 5, a part of the outer ring 2 and a part of the inner ring 3 are indicated by the long dashed double-short dashed lines. FIG. 4 illustrates a state in which the central axis of the cage 5 and the central axis of an assembly composed of the inner ring 3, the outer ring 2, and the plurality of balls 4 (hereinafter referred to simply as an "assembly") coincide with each other. In the state illustrated in FIGS. 3 and 4, the center C of a pocket surface 17 and a center C1 of the ball 4 coincide with each other. Hereinafter, the state illustrated in FIGS. 3 and 4 will be referred to as a "center coincidence state". In the center coincidence state, a clearance 18 (see FIG. 4) is formed between the ball 4 and the pocket surface 17, and the clearance 18 is constant over the entire region of the pocket surface 17.

In the center coincidence state, as illustrated in FIG. 4, a clearance (first clearance B1) in the radial direction is formed between the outer peripheral surface 12 of the annular body 11 of the cage 5 and the inner peripheral surface 23 of the first outer shoulder portion 21 of the outer ring 2. The cage 5 can be displaced toward the radially outer side by the dimension ((d2−d3)/2) of the clearance B1. Consequently, the annular body 11 contacts the inner peripheral surface 23 (cage guiding surface of the outer ring 2) of the first outer shoulder portion 21, and the cage 5 is guided by the outer ring 2 during rotation of the bearing.

In the present embodiment, in order to achieve such outer ring guiding, the cage 5 etc. is configured as follows. That is, in FIGS. 3 and 4, the pocket 10 has the pocket surface 17 which faces the outer peripheral surface of the ball 4. The pocket surface 17 is formed by a part of a spherical surface. The spherical surface has a diameter d1 that is slightly larger than a diameter d0 of the ball 4. FIG. 4 illustrates a state in which the central axis of the cage 5 and the central axis of the assembly coincide with each other as described above. The pocket 10 is formed such that the center C of the pocket 10 and the center C1 of the ball 4 coincide with each other in the case where the central axis of the cage 5 and the central axis of the assembly coincide with each other. FIG. 5 illustrates a state in which the outer peripheral surface 12 of the cage 5 contacts the cage guiding surface (inner peripheral surface 23) of the outer ring 2. As illustrated in FIG. 5, when an inferior angle formed by a line segment L1 that connects between the center C of the pocket 10 and an edge portion 19a of the inner peripheral surface of the pocket surface 17 and a line L2 that is parallel to the central axis of the cage 5 in a sectional surface that includes the central axis of the cage 5 and the center C of the pocket 10 is defined as β, a length component of the line segment L1 in a direction that is parallel to the central axis of the cage 5 is represented as (d1/2)cos β. In the state illustrated in FIG. 5, the center C1 of the ball 4 is displaced from the center C of the pocket 10 in which the ball 4 is held toward the radially inner side by half ((d2−d3)/2) a value obtained by subtracting a diameter d3 (see FIG. 4) of the outer peripheral surface 12 of the cage 5 from a diameter d2 of the cage guiding surface (inner peripheral surface 23) of the outer ring 2. In the ball 4, an intersection point between a line L3 that is perpendicular to the central axis of the cage 5 with a length component in a direction that is parallel to the central axis of the cage 5 represented as (d1/2)cos β and the surface of the ball 4 is defined as Q, and an inferior angle formed by a line segment L4 that connects between the intersection point Q and the center C1 of the ball 4 and a line segment L5 that is parallel to the central axis of the cage 5 is defined as α. Then, (d1/2)cos β=(d0/2)cos α is met. In this event, it is necessary that the surface of the ball 4 should not contact the pocket surface 17 of the cage 5 in order that the cage 5 is of the outer ring guide type, rather than the rolling element guide type. Therefore, the cage 5 is designed so as to meet the following formula [1]:

$$(d1/2)\sin \beta > (d0/2)\sin \alpha + (d2-d3)/2 \qquad [1]$$

Here, a clearance B2 (second clearance B2) in the radial direction indicated in FIG. 4 is a clearance in the radial direction formed between the ball 4 and the pocket surface 17. The second clearance B2 is a gap in the radial direction between the edge portion 19a of the pocket surface 17 which is positioned on the innermost peripheral side and the ball 4. The second clearance B2 corresponds to the difference between (d1/2)sin β and (d0/2)sin α in the formula [1], that is, "(d1/2)sin β−(d0/2)sin α", and "(d2−d3)/2" in the formula [1] corresponds to the first clearance B1.

The formula [1] is transformed into the following formula [2]:

$$(d1/2)\sin \beta - (d0/2)\sin \alpha > (d2-d3)/2 \qquad [2]$$

The left side of the formula [2] indicates the second clearance B2 as described above. The right side of the formula [2] indicates the first clearance B1. That is, the formula [1] for outer ring guide means that the first clearance B1 (right side of the formula [2]) is set to be smaller than the second clearance B2 (left side of the formula [2]) in the radial direction which is formed between the ball 4 and the pocket surface 17 (B2>B1). The gap in the radial direction between an edge portion 19b of the pocket surface 17 positioned on the outermost peripheral side and the ball 4 is defined as a third clearance B3. The first clearance B1 is set to be smaller than the third clearance B3 (B1<B3). The second clearance B2 and the third clearance B3 indicated in FIG. 4 can be equal to each other (B2=B3).

The diameter d0 of the ball 4, the diameter d1 of the pocket 10, the diameter d2 of the cage guiding surface (inner peripheral surface) of the outer ring 2, and the diameter d3 of the outer peripheral surface of the cage 5 are set (i.e. the first clearance B1 and the second clearance B2 (third clearance B3) are set) in the manner described above. Consequently, the outer peripheral surface 12 of the annular body 11 can contact the inner peripheral surface 23 of the first outer shoulder portion 21 of the outer ring 2 before the pocket surface 17 contacts the ball 4 even if the cage 5 is displaced toward the radially outer side. That is, the bearing is of the outer ring guide type, in which the cage 5 is guided by the outer ring 2, rather than by the ball 4 (rolling element guide type). As described above, the cage 5 of the angular contact ball bearing 1 according to the present embodiment has a snap shape in which the pocket surface 17 extends along a spherical surface, and is of the outer ring guide type in which the cage 5 can contact the inner peripheral side of the outer ring 2 to be positioned in the radial direction.

Figure 6:
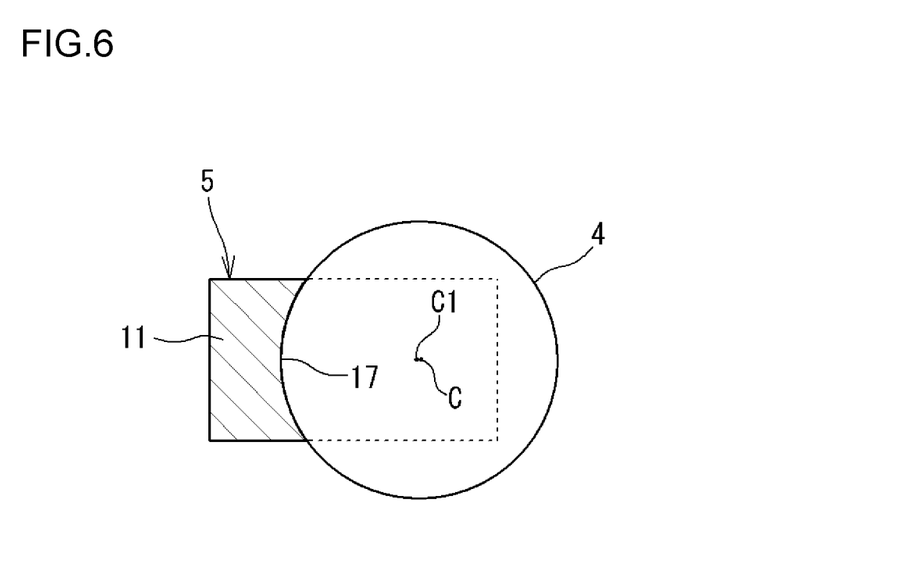
FIG. 6 illustrates the state of contact between a ball and a pocket surface.
Figure 7:
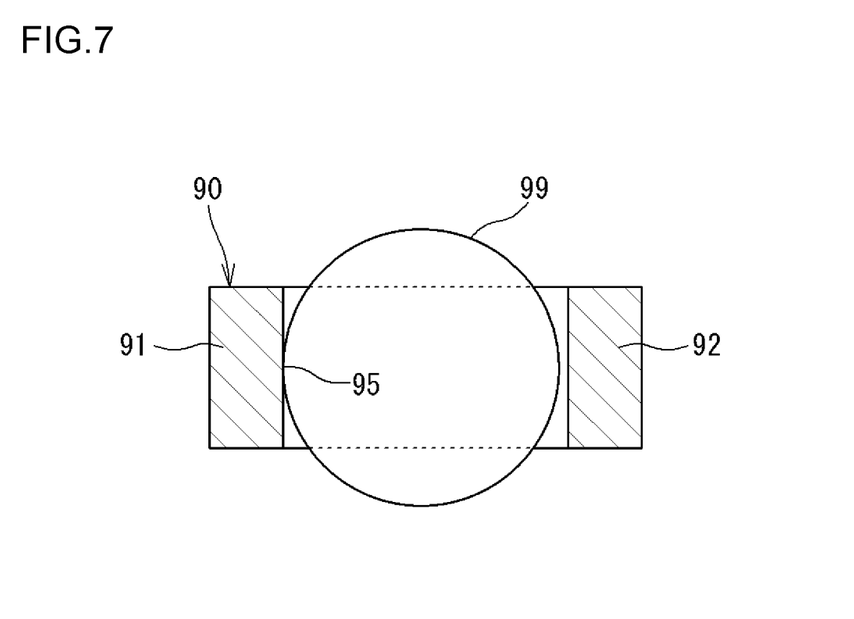
FIG. 7 illustrates an example according to the related art.

FIG. 6 illustrates the state of contact between the ball 4 and the pocket surface 17. The pocket surface 17 is a part of a spherical surface as described above. Therefore, the range of contact (elastic contact portion) between the ball 4 with a spherical outer peripheral surface and the pocket surface 17 is a circular (elliptical) region, and substantially achieves surface contact with a large contact area. In contrast, FIG. 7 illustrates an example according to the related art. A pocket surface 95 of a cage 90 according to the related art illustrated in FIG. 8 has a cylindrical surface. Therefore, the range of contact (elastic contact portion) between a ball 99 and the pocket surface 95 according to the related art is an elliptical region (contact ellipse). However, this mode of contact substantially achieves point contact with a smaller contact area than that in the present embodiment illustrated in FIG. 6. As the contact area is larger, the surface pressure which acts between the pocket surface and the ball is lower. Thus, the contact area can be increased by providing the pocket surface 17 with a shape along a spherical surface as in the present embodiment (FIG. 6). Consequently, it is possible to lower the surface pressure which acts between the pocket surface 17 and the ball 4.

In the cage 5, the prongs 13 are in a cantilever shape to project from the annular body 11 toward the other side in the axial direction. Therefore, when the cage 5 is rotated (in particular, at a high speed) by rotation of the bearing, the prongs 13 (in particular, on the end portion 14 side on the other side in the axial direction) are elastically deformed toward the radially outer side by a centrifugal force. The centrifugal force also elastically deforms the annular body 11 so as to increase the diameter thereof. However, the amount of deformation of the annular body 11 is smaller than the amount of elastic deformation of the prongs 13 (on the end portion 14 side). In addition, the cage 5 is also thermally expanded. The cage 5 is designed so as to meet the following formula [3] (which is the same as the formula [1]) even when the cage 5 is deformed by the centrifugal force or thermally expanded:

$$(d1/2)\sin \beta > (d0/2)\sin \alpha + (d2-d3)/2 \quad [3]$$

With the angular contact ball bearing 1 according to the present embodiment, as described above, the pocket surface 17 of the cage 5 is a part of a spherical surface, and rotation of the cage 5 is guided by the outer ring 2. Therefore, the cage 5 is stably guided by the outer ring 2 even in the case where the angular contact ball bearing 1 is rotated at a high speed. In addition, as described above, the area of contact between the ball 4 and the pocket surface 17 can be increased, enabling the surface pressure which is generated between the ball 4 and the cage 5 to be lowered. By forming the pocket surface 17 as a part of a spherical surface, a small clearance 18 (see FIG. 4) is formed over the area between the ball 4 and the pocket surface 17. Consequently, an oil film tends to be formed between the ball 4 and the pocket surface 17. Since the surface pressure between the ball 4 and the cage 5 can be lowered and an oil film tends to be formed between the ball 4 and the pocket surface 17 as described above, wear of the cage 5 can be suppressed.

In the present embodiment (see FIG. 1), the outer ring 2 has, on the inner peripheral side, the first outer shoulder portion 21 on one side in the axial direction and the second outer shoulder portion 22 on the other side in the axial direction. The first outer shoulder portion 21 can contact a part (annular body 11) of the cage 5 on the outer peripheral side. The second outer shoulder portion 22 is larger in inside diameter than the first outer shoulder portion 21. The outer ring raceway groove 20 is formed between the first outer shoulder portion 21 and the second outer shoulder portion 22. The outer ring raceway groove 20 becomes gradually larger in inside diameter from one side toward the other side in the axial direction. With the configuration described above, the prongs 13 of the cage 5 can be prevented from interfering with the inner peripheral side of the outer ring 2 even if the prongs 13 are elastically deformed toward the radially outer side by a centrifugal force due to rotation of the bearing. That is, in order to stabilize outer ring guide of the cage 5, the cage 5 contacts the outer ring 2 with the outer peripheral surface of the annular body 11 which is smooth and continuous.

In the present embodiment (see FIGS. 3 and 4), the cage 5 has reinforcement portions 61 and 62 so that the prongs 13 are not easily deformable toward the radially outer side by a centrifugal force. The reinforcement portions 61 and 62 are provided between the prongs 13 and 13 which are adjacent to each other in the circumferential direction (see FIG. 3) and on the radially outer side and the radially inner side (see FIG. 4) to project toward the other side in the axial direction from the annular body 11. Portions of surfaces of the reinforcement portions 61 and 62 are included in the pocket surface 17. The reinforcement portions 61 and 62 can enhance the rigidity of the prongs 13 against deformation toward the radially outer side, and particularly can enhance the rigidity of the prongs 13 on the side of their base portions. Therefore, elastic deformation of the prongs 13 toward the radially outer side can be suppressed even if the bearing is rotated and a centrifugal force acts on the cage 5. If the prongs 13 are deformed so significantly, the pocket surface 17 may contact the ball 4. However, the configuration described above can prevent such contact. That is, the bearing can be of the outer ring guide type, in which the cage 5 is guided by the outer ring 2, rather than of the rolling element guide type in which the cage 5 is guided by the ball 4.

While the rigidity of the prongs 13 is enhanced on the side of their base portions, the rigidity of the prongs 13 is lowered on the side of their distal portions. This configuration will be described. It is assumed that the plurality of balls 4 are interposed between the inner ring 3 and the outer ring 2 in an assembly of the angular contact ball bearing 1, and that the cage 5 is brought closer to the assembly in the axial direction to accommodate the balls 4 in the pockets 10. As described above (see FIG. 3), the distance between the distal end portions 66a and 66a of the hook portions 66 and 66 is smaller than the diameter of the ball 4. Therefore, it is necessary to elastically deform the hook portions 66 and 66 in order for the ball 4 to be accommodated in the pocket 10. Thus, in the present embodiment, as illustrated in FIG. 3, a bottom surface 68 of a recessed portion 67 formed between the pair of hook portions 66 and 66 and included in each of the prongs 13 is positioned on one side in the axial direction with respect to the center C of the pocket surface 17. With this configuration, the hook portions 66 and 66 which are long project from the body portion 65 in each of the prongs 13, which lowers the rigidity of the prongs 13 on the side of their distal portions. Thus, the hook portions 66 and 66 are easily deformable when the ball 4 is accommodated in the pocket 10 by elastically deforming the hook portions 66 and 66 during assembly of the bearing. Consequently, it is possible to improve assemblability.

As illustrated in FIGS. 2 and 3, respective root portions 66b and 66b of the pair of hook portions 66 and 66 in the recessed portion 67 which is formed between the pair of hook portions 66 and 66 which are included in each of the prongs 13 are shaped by a recessed curved surface 69.

Therefore, the hook portions 66 and 66 are elastically deformed as described above when the ball 4 is accommodated in the pocket 10 during assembly of the bearing. With the root portions 66b and 66b shaped by the recessed curved surface 69, however, it is possible to improve assemblability by preventing stress concentration.

With the angular contact ball bearing 1 according to the present embodiment, as described above, the area of contact between the ball 4 and the pocket surface 17 of the cage 5 can be increased. Consequently, it is possible to suppress wear of the cage 5 by reducing a surface pressure generated between the ball 4 and the pocket surface 17. As a result, the life of the bearing can be extended. In the angular contact ball bearing 1 illustrated in FIG. 1, the outer peripheral side of the inner ring 3 (the inner peripheral side of the outer ring 2) has the shape of a counterbored inner ring (the shape of a counterbored outer ring) with different shoulder diameters. Consequently, as described above, an action that pumps the grease from one side toward the other side in the axial direction is caused in the annular space S between the inner ring 3 and the outer ring 2. Consequently, the grease is collected in the space K2 on the other side in the axial direction. In the present embodiment, the cage 5 does not have an annular body on the other side in the axial direction on which the grease is collected. Therefore, the grease in the space K2 is not easily stirred by the cage 5, and the grease is not easily leaked from the second sealing device 7 on the other side in the axial direction. An annular body is not provided in the space K2 on the other side in the axial direction. Therefore, even if the cage 5 is rotated, the grease in the space K2 is not easily sheared, which prevents a reduction in life of the grease.

The embodiment disclosed above is exemplary in all respects, and not limiting. That is, the rolling bearing according to the present invention is not limited to the illustrated embodiment, and may be in other embodiments without departing from the scope of the present invention. In the embodiment described above, the cage 5 contacts the outer ring 2 on the outer peripheral surface 12 of the annular body 11, and the outer peripheral surface 12 contacts the inner peripheral surface 23 of the first outer shoulder portion 21 of the outer ring 2. However, the cage 5 and the outer ring 2 may contact each other at another location. Even in this case, the cage 5 is designed so as to meet the following formula [4] using the diameter (d4) of the cage guiding surface (inner peripheral surface) of the outer ring 2 and the diameter (d5) of the outer peripheral surface of the cage 5:

$$(d1/2)\sin \beta > (d0/2)\sin \alpha + (d4-d5)/2 \quad [4]$$

Consequently, the cage 5 which is rotated is guided by the outer ring 2 (outer ring guide type), rather than by the ball 4 (rolling element guide type).

With the rolling bearing according to the present invention, the area of contact between the ball and the pocket surface can be increased, and it is possible to suppress wear of the cage by reducing a surface pressure generated between the ball and the pocket surface.

What is claimed is:
1. A rolling bearing comprising:
an inner ring;
an outer ring;
a plurality of balls provided between the inner ring and the outer ring; and
a snap cage in which a plurality of pockets that accommodate the plurality of balls are formed along a circumferential direction, the snap cage having an annular body provided on a first side in an axial direction, and a plurality of prongs extending from the annular body toward a second side in the axial direction, the plurality of pockets being spaces on the second side of the annular body in the axial direction that are located between each prong of the plurality of prongs which are adjacent to each other in the circumferential direction, wherein:
a pocket surface of each pocket of the plurality of pockets that faces each ball of the plurality of balls is a part of a spherical surface,
the snap cage contacts an inner peripheral surface of the outer ring for positioning in a radial direction, and
a first clearance in the radial direction formed between an outer peripheral side of the snap cage and the inner peripheral surface of the outer ring is smaller than a second clearance in the radial direction formed between each ball of the plurality of balls and the pocket surface of each pocket of the plurality of pockets.

2. The rolling bearing according to claim 1, wherein the outer ring includes:
a first outer shoulder portion on the first side in the axial direction contacting a part of the snap cage on the outer peripheral side, and
a second outer shoulder portion on the second side opposite to the outer peripheral side in the axial direction that is larger in inside diameter than the first outer shoulder portion.

3. The rolling bearing according to claim 1, wherein:
each prong of the plurality of prongs includes:
a body portion that extends from the annular body in the axial direction, and
a pair of hook portions that extend from the body portion in the axial direction; and
a bottom surface of a recessed portion formed between the pair of hook portions is positioned on the first side in the axial direction with respect to a center of the pocket surface of each pocket of the plurality of pockets.

4. The rolling bearing according to claim 1, wherein:
each prong of the plurality of prongs includes:
a body portion that extends from the annular body in the axial direction, and
a pair of hook portions that extend from the body portion in the axial direction; and
respective root portions of the pair of hook portions in a recessed portion formed between the pair of hook portions are shaped as a recessed curved surface.

5. The rolling bearing according to claim 1, wherein the snap cage includes reinforcement portions projecting from the annular body in the axial direction and located between adjacent prongs of the plurality of prongs in the circumferential direction, the reinforcement portions being on a radial outer side of the annular body and a radial inner side of the annular body.

* * * * *